United States Patent Office 3,185,961
Patented May 25, 1965

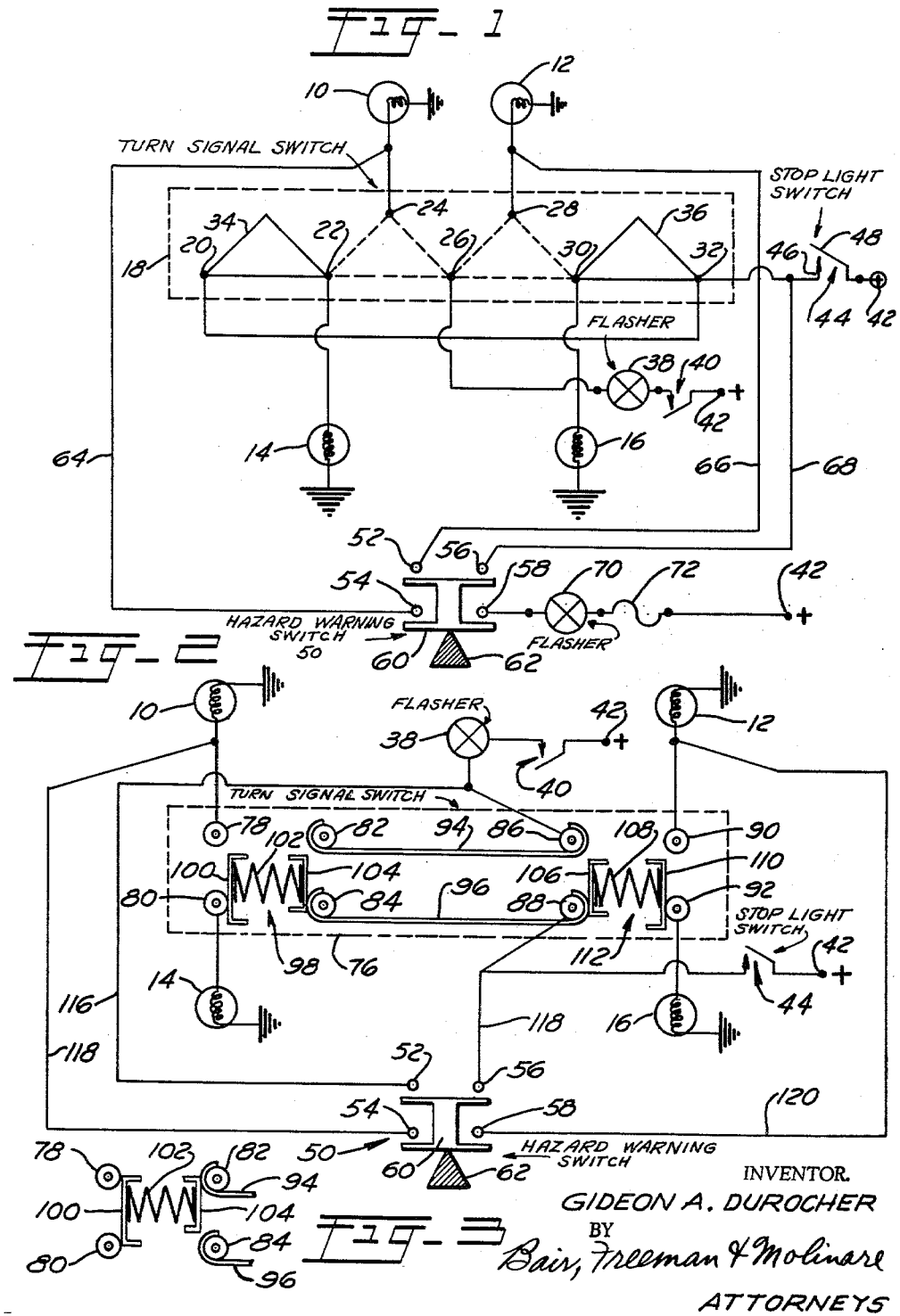

3,185,961
DISABLED VEHICLE SIGNALING CIRCUIT
Gideon A. Du Rocher, Mount Clemens, Mich., assignor to Essex Wire Corporation, Fort Wayne, Ind., a corporation of Michigan
Filed Nov. 5, 1962, Ser. No. 235,422
4 Claims. (Cl. 340—81)

This invention relates generally to hazard warning systems and more particularly to a new and improved electrical signaling circuit of the type used for causing all four directional signals of a motor vehicle to flash simultaneously as a vehicular traffic hazard warning.

Directional signals for providing visual indications of the turning movement of an automotive vehicle are well known and are in common use. Generally, such directional signal systems include signal lamps, positioned on the right and left sides of the vehicle and at the front and rear portions thereof, a turn indicator switch, positioned upon or near the steering column of the vehicle and operable to selectively energize the signal lamps on either side of the vehicle, and a flasher unit to interrupt the circuit to or flash the selectively energized signal lamps. Frequently, the directional signal systems are arranged so that existing automotive lamps, such as the parking lamps or the stop signal lamps, can be utilized as directional signal lamps to eliminate the need for additional lamps and wiring therefor.

When a vehicle is required to make an emergency stop, it is highly desirable that a hazard warning be provided to signal the drivers of approaching vehicles. It is known to use flares for this purpose, and it also is known to utilize the lamps of the automotive vehicle illuminating and signaling system for this purpose, but the manufacture and installation costs of the latter has heretofore proved an impediment to its widespread adoption in both passenger and commercial automotive vehicles.

Accordingly, it is a general object of this invention to provide a new and improved hazard warning system adapted for automotive vehicle use at reduced manufacturing and installation cost.

It is another object of this invention to provide a new and improved hazard warning system for automotive vehicle use which in one embodiment comprises a four terminal hazard warning switch and a separate hazard warning flasher, and which requires only three wire connections to an existing automotive vehicle turn signal circuit for operation in response to a single driver action.

It is still another object of this invention to provide a highly novel hazard warning system for automotive use which in another embodiment comprises only the addition of a four terminal hazard warning switch to an automotive vehicle turn signal circuit and which is adapted to be connected thereto by the use of only four wire connections.

It is a further object of this invention to provide a unique automotive vehicle hazard warning system, as above, which is characterized by its efficiency of operation in simultaneously flashing all of the turn signal lamps of an automotive vehicle upon command and by its great economy of assembly and installation with the turn signal circuit of an automotive vehicle.

The novel features which are characteristic of the invention are set forth with particularity in the appended claims. The invention itself, however, both as to its organization and method of operation, together with further objects and advantages thereof, will best be understood by reference to the following description taken in conjunction with the accompanying drawing in which:

FIGURE 1 is a schematic electrical circuit diagram of one illustrative embodiment of the inventive hazard warning system employing a four terminal switch and a hazard flasher, as connected in combination with an automotive vehicle turn signal circuit;

FIGURE 2 is a schematic electrical circuit diagram of another illustrative embodiment of the invention employing only a four terminal hazard warning switch connected in combination with an automotive vehicle turn signal circuit; and FIGURE 3 illustrates the operation of the turn signal switch shown in the illustrative embodiment of FIGURE 2.

Referring now to the drawings, and more particularly to FIGURE 1, there is shown an electrical schematic circuit diagram of one illustrative embodiment of the present invention. Since it is a feature of this invention that the hazard switch system is arranged in combination with an existing turn signal circuit in an automotive vehicle, the circuit diagram of FIGURE 1 illustrates the connections of the hazard switch system to a turn signal circuit of a type known in the art. As brought out in greater detail hereinbelow, the hazard switch system cooperates with the turn signal circuit in a new and highly advantageous fashion to materially reduce the costs of manufacture and installation of the hazard switch system.

As shown in FIGURE 1, the present invention includes the conventional turn signal lamps located on both sides and at the front and rear of an automotive vehicle. Thus, lamp 10 is the left front turn signal indicating lamp, lamp 12 is the right front indicating lamp, lamp 14 is the left rear indicating lamp, and lamp 16 is the right rear indicating lamp of the automotive vehicle. It will be noted that one filament terminal of each of these lamps is connected to ground. The system circuit further includes a turn signal switch 18 of any suitable type which generally is mounted on or adjacent the steering column of the automotive vehicle and which comprises a selectively operable switch member capable of being actuated in one direction to energize the turn signal lamps on one side of the automotive vehicle to indicate a turning movement in that direction, and also capable of being actuated in the opposite direction to energize the turn signal lamps on the other side of the automotive vehicle to indicate a turning movement in the opposite direction.

In the illustrative turn signal switch 18 illustrated in FIGURE 1, there is provided a plurality of stationary contacts identified respectively at 20, 22, 24, 26, 28, 30 and 32, as well as a pair of movable contact members identified at 34 and 36. As shown in FIGURE 1, the movable contact members 34 and 36 are in the nonindicating position, i.e., the position of rest when no turning movement of the automotive vehicle is to be indicated on the turn signal lamps. In accordance with the well-known operation of such turn signal switches, the actuation of the turn signal switch to indicate a left turn movement of the automotive vehicle causes the contact member 34 to be moved from the solid line position shown in FIGURE 1 to the dotted line position immediately adjacent thereto. Similarly, when the turn signal switch is actuated to indicate a right turn movement of the automotive vehicle, the contact member 36 is moved from the solid line position shown in FIGURE 1 to the dotted line position immediately adjacent thereto.

The common stationary contact 26 in the turn signal switch 18 is connected to a circuit current interrupter or flasher which, as known to those skilled in the art, serves when energized to repetitively interrupt the current flow to the energized turn signal lamps to provide a flashing indication of the turning movement of the automotive vehicle. Since the structural details of such circuit interrupters or flashers are well known in the art, they need not be further described herein. The flasher 38, in turn, is connected to the contacts of the automotive vehicle ignition switch 40, which is returned to the positive terminal of the electrical power source, such as the automotive battery.

In the operation of the turn signal circuit, the closing of the ignition switch contacts and the actuation of the turn signal switch to one or the other of the dotted line positions shown for the contact members 34 and 36, causes a circuit to be completed to the associated turn signal lamps to provide the flashing indication of the turning movement for the automotive vehicle described hereinabove.

In addition to the flashing indication provided by the turn signal lamps upon actuation of the turn signal switch 18, the circuit of FIGURE 1 is provided with a brake stop light switch 44 which includes the contacts 46 and 48. As well known to those skilled in the art, the movable contact 48 may be operatively connected to the foot brake of the automotive vehicle such that the depression of the foot brake by the driver causes the contacts 46 and 48 to be closed. Since the movable contact 48 is connected to the positive power supply terminal 42, the closing of the contacts of the brake stop light switch 44 causes the rear signal lamps 14 and 16 to be energized for indicating the braking operation to the drivers of vehicles to the rear of the automotive vehicle.

In accordance with a salient feature of the present invention, the system is provided with a hazard warning switch 50 which is independently operable by a single action of the driver to cause all of the indicating lamps, both front and rear, to flash simultaneously for indicating a hazard condition. For example, such a condition could exist when the automotive vehicle makes an emergency stop on the road for reasons of engine trouble, tire repair, or similar reasons which require that adequate warning of the stopped automotive vehicle be given to approaching vehicles. As shown in FIGURE 1, the hazard warning switch 50 comprises a four terminal switch having the stationary contacts 52, 54, 56 and 58 which are operatively associated with a movable contact member 60. The contact member 60 is formed of a suitable conductive material such that the actuation of the contact member 60, as by the inward operation of the knob 62, places all of the stationary contacts 52, 54, 56 and 58 in electrical connection with each other.

The stationary contact 54 is connected by the conductor 64 to the filament of the left front indicating lamp 10, while the stationary contact 52 is connected by the conductor 66 to the filament of the right front indicating lamp 12. The stationary contact member 56 is connected by the conductor 68 to the contact 46 of the brake stop light switch 44 while the stationary contact 58 is connected to another circuit interrupter or flasher 70. The flasher 70 advantageously may be connected by a suitable circuit protector or fuse 72 to the positive terminal 42 of the electrical power supply battery.

The hazard warning switch 50 is shown in FIGURE 1 with the movable contact member 60 in the inoperative or rest position. Under this condition, the front and rear indicating lamps can be energized only by the actuation of the turn signal switch 18 to indicate a turning movement, while the rear indicating lamps can also be energized by the operation of the brake stop light switch 44. When an emergency condition occurs, and it is necessary to flash all of the indicating lamps simultaneously to indicate a hazard condition to approaching motor vehicles, the knob 62 of the hazard warning switch is actuated to cause the movable contact member 60 to engage all of the stationary contacts of the hazard warning switch. At this time, a circuit will be completed from the power source through the flasher 70 to each of the indicating lamps at the front and rear, and on both sides, of the automotive vehicle. Thus, all of these indicating lamps are caused to flash simultaneously to provide an adequate warning of the hazard condition.

Those skilled in the art will appreciate that the hazard warning switch 50 cooperates with the turn signal circuit in a new and highly advantageous manner to greatly reduce the cost of manufacture and installation of the hazard warning system. Thus, in addition to the existing turn signal circuit, all that is required is a four terminal switch 50, the flasher 70, and the connecting wires which serve to connect the stationary contacts of the hazard warning switch to the appropriate terminals in the turn signal circuit. It further will be noted that when the ignition switch 40 and the turn signal switch 18 are both in the closed position, and the hazard warning switch 50 is actuated, both flashers 38 and 70 are operatively connected in the circuit. Actual tests and use of the circuit shown in FIGURE 1 have indicated that the flasher with the fastest calibration acts to immediately assume command and operates to flash all of the direction signal lamps simultaneously.

An alternative illustrative embodiment fo the invention is shown in FIGURE 2 of the drawing in which elements similar to the circuit elements of FIGURE 1 have been identified with similar reference numerals. As shown in the FIGURE 2 circuit, a plurality of turn signal indicator lamps is provided for the automotive vehicle with the energization of such lamps for indicating turning movement of the vehicle being determined by the selective actuation of the turn signal switch 76.

While the indicating lamps 10, 12, 14 and 16 of FIGURE 2 are similar to the like-identified signal lamps of FIGURE 1, the FIGURE 2 turn signal switch 76 is of a different construction than the turn signal switch 18 of FIGURE 1. Thus, the turn signal switch 76 comprises a left turn indicating portion including stationary contacts 78, 80, 82 and 84 which are adapted to be selectively engaged by the movable contact member 98, in a manner described below. The right turn signaling portion of the turn signal switch 76 similarly comprises four stationary contacts 86, 88, 90 and 92 which are adapted to be selectively engaged by the movable contact member 112. Stationary contact 82 is connected to the stationary contact 86 by means of a suitable electrically conductive strap or conductor 94, while stationary contact 84 is connected to stationary contact 88 by means of an electrically conductive strap or conductor 96.

Stationary conductor 78 is connected to the filament of the left front lamp 10 while the stationary contact 80 is connected to the filament of the left rear lamp 14. Stationary contact 90 is connected to the filament on the right front lamp 12 while stationary contact 92 is connected to the filament of the right rear lamp 16. Each of these filaments is returned to ground as indicated in the drawing. In addition to these connections, the turn signal circuit of the system further includes a circuit interrupter or flasher 38 having one terminal connected to stationary contact 86 and having its other terminal connected to the ignition switch 40 which is returned to the positive power supply terminal 42. Also, stationary contact 88 is connected through the contacts of the brake stop light switch 44 to the positive power supply terminal 42.

In the operation of the turn signal switch 76 shown in FIGURE 2, the de-energized or rest position of the turn signal switch is shown in the drawing. Since the movable contact member 98 comprises a long wiper contact 100 and a short wiper contact 104 separated from each other by the expansion spring member 102, it can be seen that in the rest position the stationary contact 80 is electrically connected to the stationary contact 84. At this time, there is no connection between the stationary contacts 78 and 82 with the movable contact member 98. Similarly, in the rest position, the long wiper contact 110 of movable contact member 112 is electrically connected to the stationary contact 92 while the short wiper contact 106 of the movable contact member 112 is electrically connected to the stationary contact 88, with the expansion spring 108 positioned therebetween for maintaining this condition of the contact members.

When the driver of the automotive vehicle desires to make a turning movement, this can be indicated by actuating the turn signal switch in a desired direction for energizing either the left or right indicating lamps, as appropriate. For example, as illustrated in FIGURE 3 of the drawing, if a left turn is to be made, the actuation of the turn signal switch 76 in the proper direction causes the movable contact member 98 to be moved upwardly from the rest position such that the long wiper contact 100 engages both of the stationary contacts 78 and 80 while the short wiper contact 104 is engaged with only the stationary contact 82. As such, a circuit will be completed from the power supply terminal 42 through the closed ignition switch 40, the circuit interrupter or flasher 38, the stationary contacts 86 and 82 and contact member 98 of the turn signal switch 76 to flash the left front and rear lamps 10 and 14, respectively. The action of the right turn signal switch 76 is similar for causing the right front and rear lamps 12 and 16 to be flashed upon proper selective actuation of the turn signal switch.

It further can be seen, from the illustrative embodiment shown in the circuit of FIGURE 2, that the operation of the stop light switch 44, by the depression of the foot brake pedal in the automotive vehicle, causes the left and right rear lamps 14 and 16, respectively, to be energized through the contacts of turn signal switch 76, shown to be closed in the FIGURE 2 drawing. In this manner, the operation of the brake foot pedal by the operator of the automotive vehicle provides a stop light warning signal to the rear of the automotive vehicle.

When a hazard condition occurs and it is desirable to provide a hazard signal, the operating knob 62 may be pushed inwardly to cause the movable contact arm 60 to engage the stationary contacts 52, 54, 56 and 58 for completing an electrical circuit therebetween. Under these conditions, a circuit is completed between the positive terminal 42 of the power supply, the closed ignition switch 40, and the flasher 38 to the stationary contact 52 of the hazard warning switch for providing the desired operation. This circuit is extended by means of the movable contact member 60 to the stationary contact 54 and conductor 114 for flashing the left front lamp 10, to the stationary contact 58 and the conductor 120 for flashing the right front lamp 12 and through the stationary contact 56 and the conductor 118 to the stationary contact 88 in the turn signal switch 76. Since the stationary contact 88 is connected to the right rear lamp 16 by means of the movable contact member 112 and the stationary contact 92, the right rear lamp is flashed. Similarly, the stationary contact 88 is connected by means of the conductive strap 96 to the stationary contact 84, which in turn is connected through the movable contact member 98 and the stationary contact 80 to the left rear lamp 14 for flashing the same. In this manner, the actuation of the hazard warning switch knob 62 to close the electrical circuit for all of the stationary contacts causes all of the signaling lamps of the automotive vehicle to be flashed simultaneously.

It further will be appreciated by those skilled in the art that if desired, means may be provided to indicate to the driver the energized condition of the hazard warning system. Advantageously, this may be effected by connecting a suitable indicating lamp in circuit with the hazard warning switch 50 such that the lamp is energized when the switch is actuated. Preferably the indicating lamp should be positioned at or near the switch knob 62 for ready observance by the driver.

While there has been shown and described a specific embodiment of the present invention, it will, of course, be understood that various modifications and alternative constructions may be made without departing from the true spirit and scope of the invention. Therefore, it is intended by the appended claims to cover all such modifications and alternative constructions as fall within their true spirit and scope.

What is claimed as the invention is:

1. An electrical signaling system for automotive vehicles comprising the combination of an electrical power source; a turn signal circuit connected to said electrical power source, said turn signal circuit comprising front and rear lamps adapted to be selectively energized from said power source to indicate a turning movement of the automotive vehicle, a turn signal switch having a plurality of contacts adapted to be selectively actuated for determining the lamps to be energized, and a circuit interrupting flasher connected between said turn signal switch and said power source for repetitively interrupting the current flow to the lamps selected by said turn signal switch to provide a flashing indication of the automotive vehicle turning movement; a stop light switch having contacts connected between the power source and the rear lamp terminals of said turn signal switch and adapted when actuated to energize the rear lamps of the automotive vehicle; and a hazard warning circuit for causing all of said front and rear lamps to be repetitively energized and flashed simultaneously to indicate a hazard condition of the automotive vehicle, said hazard warning circuit comprising four stationary contact members and a selectively movable contact member, two of said stationary contact members being connected respectively to said front lamps, a third stationary contact member being connected to a circuit interrupting flasher, and the fourth stationary contact member being connected to the contact of said stop light switch which is connected to the rear lamps through the turn signal switch, said movable contact member normally being out of contact with said stationary contact members and being adapted when actuated to complete a circuit between all four of said stationary contact members to cause all of said front and rear lamps to be flashed simultaneously to indicate the existence of a hazard condition.

2. An electrical signaling system for automotive vehicles comprising the combination of an electrical power source; a turn signal circuit connected to said electrical power source, said turn signal circuit comprising front and rear lamps adapted to be selectively energized from said power source to indicate a turning movement of the automotive vehicle, a turn signal switch having a plurality of contacts adapted to be selectively actuated for determining the lamps to be energized, and a circuit interrupting flasher connected between said turn signal switch and said power source for repetitively interrupting the current flow to the lamps selected by said turn signal switch to provide a flashing indication of the automotive vehicle turning movement; a stop light switch having contacts connected between the power source and the rear lamp terminals of said turn signal switch and adapted when actuated to energize the rear lamps of the automotive vehicle, and a hazard warning circuit for causing all of said front and rear lamps to be repetitively energized and flashed simultaneously to indicate a hazard condition of the automotive vehicle, said hazard warning circuit comprising a plurality of stationary contact members and a selectively movable contact member, two of said stationary contact members being connected respectively to said front lamps, a further stationary contact member being connected to the contact of said stop light switch which is connected to said rear lamps through the turn signal switch, and means for connecting a circuit interrupting flasher to said selectively movable contact member, said movable contact member normally being out of contact with said stationary contact members and being adapted when actuated to complete a circuit with said stationary contact members to cause all of said front and rear lamps to be flashed simultaneously to indicate the existence of a hazard condition.

3. An electrical signalling system for automotive vehicles comprising the combination of an electrical power source; a turn signal circuit connected to said electrical power source, said turn signal circuit comprising front and rear lamps adapted to be selectively energized from said power source to indicate a turning movement of the automotive vehicle, a turn signal switch having a plurality of contacts adapted to be selectively actuated for determining the lamps to be energized, and a first circuit interrupting flasher connected between said turn signal switch and said power source for repetitively interrupting the current flow to the lamps selected by said turn signal switch to provide a flashing indication of the automotive vehicle turning movement; a stop light switch having contacts connected between the power source and the rear lamp terminals of said turn signal switch and adapted when actuated to energize the rear lamps of the automotive vehicle; and a hazard warning circuit for causing all of said front and rear lamps to be repetitively energized and flashed simultaneously to indicate a hazard condition of the automotive vehicle, said hazard warning circuit comprising a second circuit interrupting flasher connected to a hazard warning switch having a plurality of stationary contact members and a selectively movable contact member, and means for quickly and inexpensively connecting said hazard warning circuit to said turn signal circuit, said last-named means comprising three conductors with two of said conductors respectively connecting two stationary contact members of said hazard warning switch to said front lamps and the other conductor connecting another stationary contact member of said hazard warning switch to the contact of said stop light switch which is connected to said rear lamps through the turn signal switch, said movable contact member normally being out of contact with said stationary contact members and being adapted when actuated to complete a circuit with said stationary contact members to cause all of said front and rear lamps to be flashed simultaneously to indicate the existence of a hazard condition.

4. An electrical signaling system for automotive vehicles comprising the combination of an electrical power source; a turn signal circuit connected to said electrical power source, said turn signal circuit comprising front and rear lamps adapted to be selectively energized from said power source to indicate a turning movement of the automotive vehicle, a turn signal switch having a plurality of contacts adapted to be selectively actuated for determining the lamps to be energized, and a circuit interrupting flasher connected between said turn signal switch and said power source for repetitively interrupting the current flow to the lamps selected by said turn signal switch to provide a flashing indication of the automotive vehicle turning movement; a stop light switch having contacts connected between the power source and the rear lamp terminals of said turn signal switch and adapted when actuated to energize the rear lamps of the automotive vehicle; and a hazard warning circuit for causing all of said front and rear lamps to be repetitively energized and flashed simultaneously to indicate a hazard condition of the automotive vehicle, said hazard warning circuit comprising a hazard warning switch having a plurality of stationary contact members and a selectively actuatable movable contact member, and means for quickly and inexpensively connecting said hazard warning circuit to said turn signal circuit, said last-named means comprising four conductors, two of said conductors respectively connecting two of said stationary contact members of said hazard warning switch to said front lamps, a third conductor connecting a contact member of said hazard warning switch to said circuit interrupting flasher, and a further conductor connecting the fourth stationary contact member of said hazard warning switch to a contact of said stop light switch, said movable contact member normally being out of contact with said stationary contact members and being adapted when actuated to complete a circuit with said stationary contact members to cause all of said front and rear lamps to be flashed simultaneously to indicate the existence of a hazard condition.

References Cited by the Examiner
UNITED STATES PATENTS

| 2,692,981 | 10/54 | Hollins | 340—81 |
| 2,706,808 | 4/55 | Hollins | 340—81 |
| 3,114,015 | 12/63 | Magazanik | 340—74 XR |

NEIL C. READ, *Primary Examiner.*